United States Patent
Zaitsu et al.

(10) Patent No.: US 10,748,567 B1
(45) Date of Patent: Aug. 18, 2020

(54) DATA STORAGE DEVICE ABORTING WRITE OPERATION BASED ON ACCUMULATED TRACK SQUEEZE METRIC FOR ADJACENT DATA TRACK

(71) Applicant: Western Digital Technologies, Inc., San Jose, CA (US)

(72) Inventors: Hideki Zaitsu, Fujisawa (JP); Niranjay Ravindran, Rochester, MN (US); So Ogiwara, Yokohama (JP); Toshihisa Komai, Yokohama (JP); Alain Chahwan, Irvine, CA (US); Weldon M. Hanson, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/655,630

(22) Filed: Oct. 17, 2019

(51) Int. Cl.
*G11B 5/09* (2006.01)
*G11B 5/55* (2006.01)
*G11B 27/36* (2006.01)
*G11B 20/10* (2006.01)

(52) U.S. Cl.
CPC ...... *G11B 5/5539* (2013.01); *G11B 20/10388* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 6,628,471 B1 * | 9/2003 | Min | G11B 5/59627 360/31 |
| 6,781,780 B1 | 8/2004 | Codilian | |
| 6,882,489 B1 | 4/2005 | Brunnett et al. | |
| 7,271,977 B1 * | 9/2007 | Melrose | G11B 5/59627 360/77.02 |
| 7,639,447 B1 * | 12/2009 | Yu | G11B 19/045 360/77.04 |
| 7,672,072 B1 | 3/2010 | Boyle et al. | |
| 8,174,780 B1 | 5/2012 | Tsai et al. | |
| 8,885,283 B1 | 11/2014 | Chahwan et al. | |
| 8,922,937 B1 | 12/2014 | Chahwan et al. | |
| 8,953,271 B1 * | 2/2015 | Chayarangkan | G11B 5/59627 360/55 |
| 8,953,277 B1 * | 2/2015 | Wu | G11B 5/012 360/50 |
| 9,026,728 B1 * | 5/2015 | Xi | G11B 5/59688 711/111 |
| 9,082,458 B1 * | 7/2015 | Tang | G11B 20/1258 |
| 9,269,393 B1 | 2/2016 | Webb et al. | |
| 9,632,863 B2 | 4/2017 | Galbraith et al. | |
| 10,373,645 B2 | 8/2019 | Burton et al. | |
| 2008/0259488 A1 * | 10/2008 | Kang | G11B 19/045 360/77.08 |
| 2015/0254135 A1 * | 9/2015 | Chatradhi | H03M 13/3738 714/764 |

* cited by examiner

*Primary Examiner* — Peter Vincent Agustin

(57) ABSTRACT

A data storage device is disclosed comprising a head actuated over a disk comprising a plurality of data tracks, including consecutive data tracks N−1 and N. A first write to data track N is performed using a first position error signal (PES) representing a position of the head relative to the data tracks. A track squeeze metric is generated for data track N−1 based on at least the first PES of the first write. The track squeeze metric for data track N−1 is accumulated during the first write, and the first write is aborted when the accumulated track squeeze metric for data track N−1 exceeds a first threshold.

20 Claims, 9 Drawing Sheets

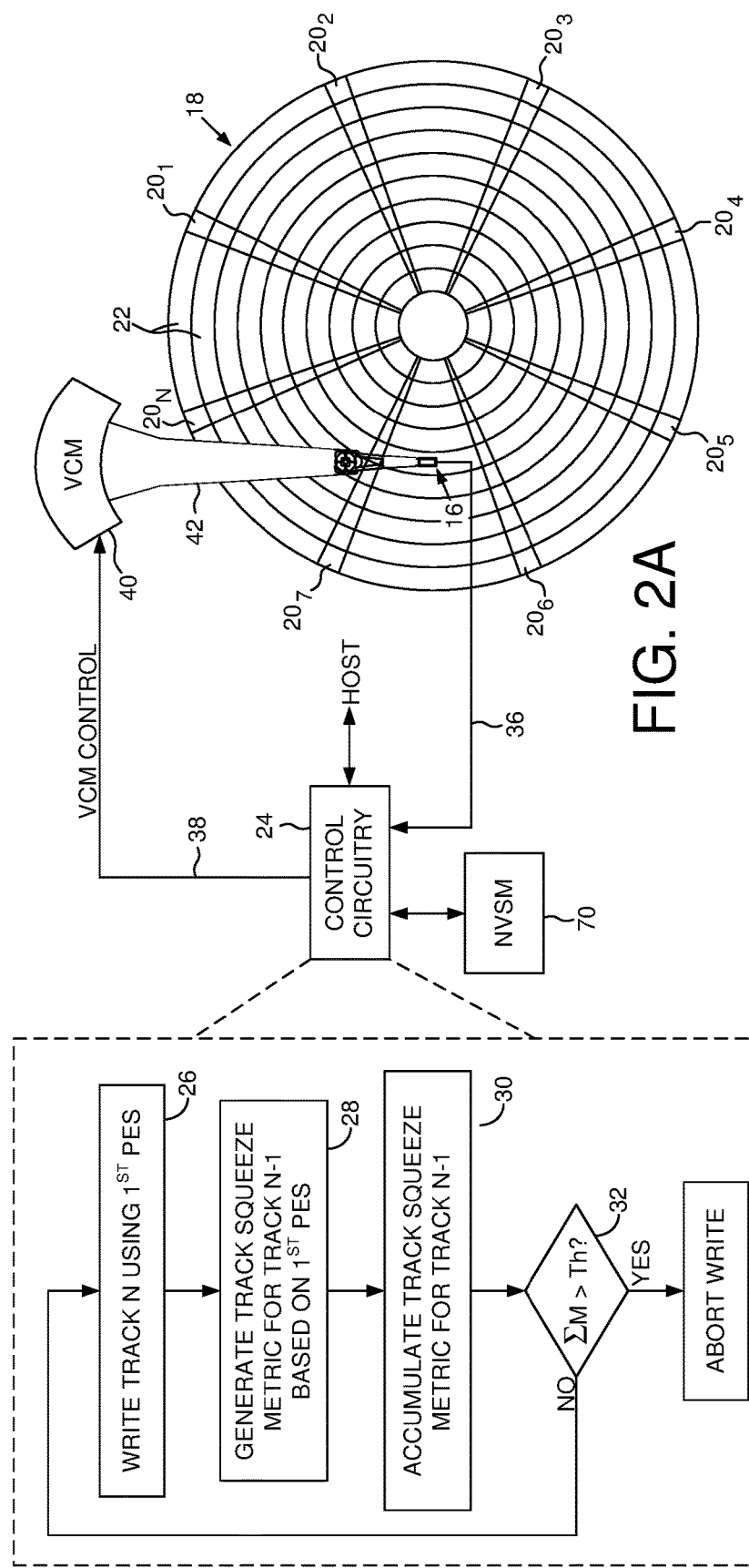

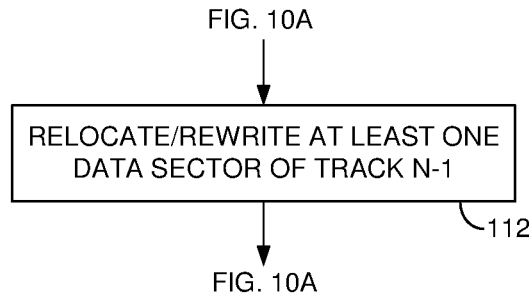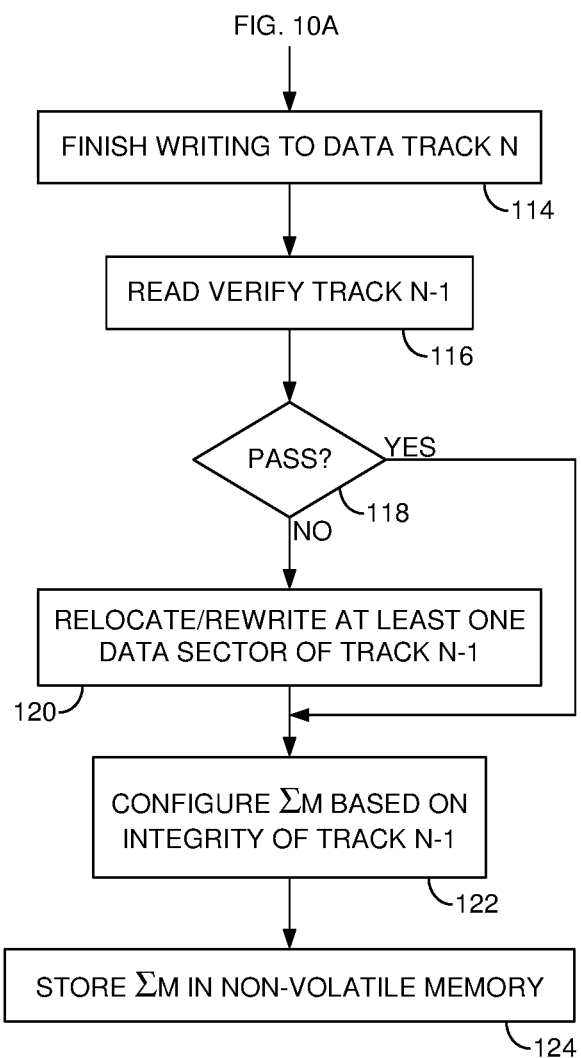

DATA STORAGE DEVICE ABORTING WRITE OPERATION BASED ON ACCUMULATED TRACK SQUEEZE METRIC FOR ADJACENT DATA TRACK

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over a disk.

FIG. 2B is a flow diagram according to an embodiment wherein when writing to data track N, a track squeeze metric is accumulated for data track N−1 and the write is aborted when the accumulated track squeeze metric exceeds a write abort threshold.

FIG. 2C shows an example track squeeze of data track N−1 when writing to data track N.

FIG. 10B extends on the flow diagram of FIG. 10A according to an embodiment wherein when the first data recovery fails, at least one of the data sectors of data track N−1 is relocated or rewritten after being recovered by the second data recovery.

FIG. 10C extends on the flow diagram of FIG. 10A according to an alternative embodiment wherein after recovering the data sectors of data track N−1 using the track level redundancy, the write to data track N is completed and a read verify of data track N−1 is performed.

DETAILED DESCRIPTION

Figure 1:
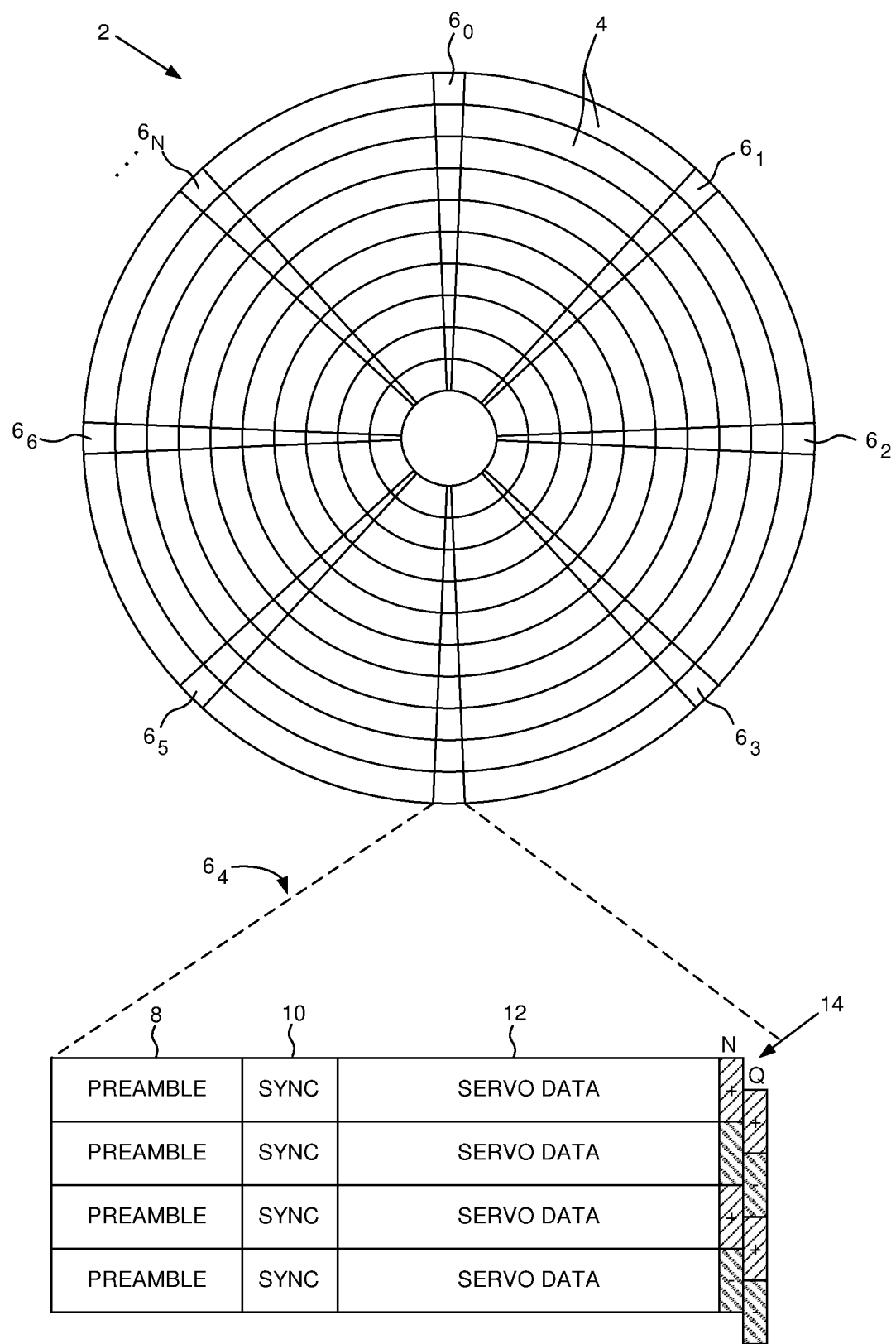
FIG. 1 shows a prior art disk format comprising a plurality of servo tracks defined by servo sectors.

FIG. 2A shows a data storage device in the form of a disk drive according to an embodiment comprising a head 16 actuated over a disk 18 comprising servo data (e.g., servo sectors $20_1$-$20_N$) for defining a plurality of data tracks 22, including consecutive data tracks N−1 and N. The disk drive further comprises control circuitry 24 configured to execute the flow diagram of FIG. 2B, wherein during a first write to data track N using a first position error signal (PES) representing a position of the head relative to the data tracks (block 26), a track squeeze metric for data track N−1 is generated based on at least the first PES of the first write (block 28). The track squeeze metric for data track N−1 is accumulated during the first write (block 30), and the first write is aborted (block 34) when the accumulated track squeeze metric for data track N−1 exceeds a first threshold (block 32).

In the embodiment of FIG. 2A, the disk 18 comprises a plurality of servo sectors $20_1$-$20_N$ that define a plurality of servo tracks, wherein the data tracks 22 are defined relative to the servo tracks at the same or different radial density. The control circuitry 24 processes a read signal 36 emanating from the head 16 to demodulate the servo sectors and generate a position error signal (PES) representing an error between the actual position of the head and a target position relative to a target track. A servo control system in the control circuitry 24 filters the PES using a suitable compensation filter to generate a control signal 38 applied to a VCM 40 which rotates an actuator arm 42 about a pivot in order to actuate the head radially over the disk surface in a direction that reduces the PES. In one embodiment, the head 16 may be actuated over the disk 18 based on the PES using one or more secondary actuators, for example, a microactuator that actuates a suspension coupling a head slider to the actuator arm 42, or a microactuator that actuates the head slider relative to the suspension (e.g., using a thermal actuator, piezoelectric actuator, etc.). The servo sectors $20_1$-$20_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

FIG. 2C shows an example of an off-track write toward data track N−1 while writing to data track N due to the head following write trajectory 37. In one embodiment, the off-track write of data track N may corrupt the data previously recorded in data track N−1 rendering one or more data sectors unrecoverable. Conventionally, writing to a data track is aborted when an excessive off-track condition is detected (i.e., when the PES exceeds a write abort threshold) so as to minimize the amount of data corrupted in the adjacent data tracks. The data track density (tracks per inch) and write abort threshold are typically configured to ensure the recoverability of the data sectors in the adjacent data tracks. An increase in capacity (e.g., by increasing the data track density) has been achieved by generating track level redundancy over at least two data sectors of a data track, such as generating a hard or soft parity sector over at least two data sectors. The inventors of the present application have observed the capacity improvement realized with track level redundancy depends on the overall level of corruption to the data sectors due to adjacent track interference during write operations. Accordingly in one embodiment when writing to data track N, a track squeeze metric is accumulated for data track N−1, and the write to data track N is aborted when the accumulated track squeeze metric for data track N−1 exceeds a write abort threshold, thereby preserving the correction power of the track level redundancy.

Figure 3:
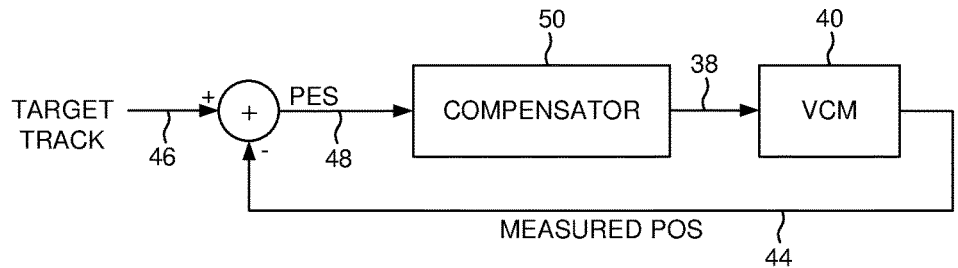
FIG. 3 shows an embodiment of a servo control system for servoing the head over a data track during a write operation.
Figure 4A:
FIG. 4A shows an embodiment wherein a track squeeze metric is generated by comparing a PES to a threshold.

Any suitable track squeeze metric may be generated and accumulated in the embodiments described herein. FIG. 3 shows a servo control system for positioning the head during a write operation according to an embodiment wherein a measured position 44 of the head is subtracted from a target position 46 to generate a PES 48. The PES 48 is filtered by a suitable servo compensator 50 in order to generate a control signal 38 applied to the VCM 40. In one embodiment, the measured position 44 of the head may be generated by reading the servo data recorded in the servo sectors $20_1$-$20_N$. Regardless as to how the PES 48 is generated, in one embodiment a track squeeze metric for data track N−1 may be generated and accumulated based on the PES 48 when writing to data track N. For example in an embodiment shown in FIG. 4A, the track squeeze metric may be generated for data track N−1 by comparing the PES 48 to a threshold 60A when writing to data track N. In one embodiment, the track squeeze metric may be generated as a counter that is incremented each time the PES 48 exceeds the threshold 60A at each servo sector. In another embodiment, the track squeeze metric may be generated as the difference between the PES 48 and the threshold 60A at each servo sector, wherein the track squeeze metric may be zero when the PES is below the threshold 60A. In one embodiment if the accumulated track squeeze metric for track N−1 exceeds a write abort threshold, the write to data track N is aborted such as shown in FIG. 4A.

Figure 4B:
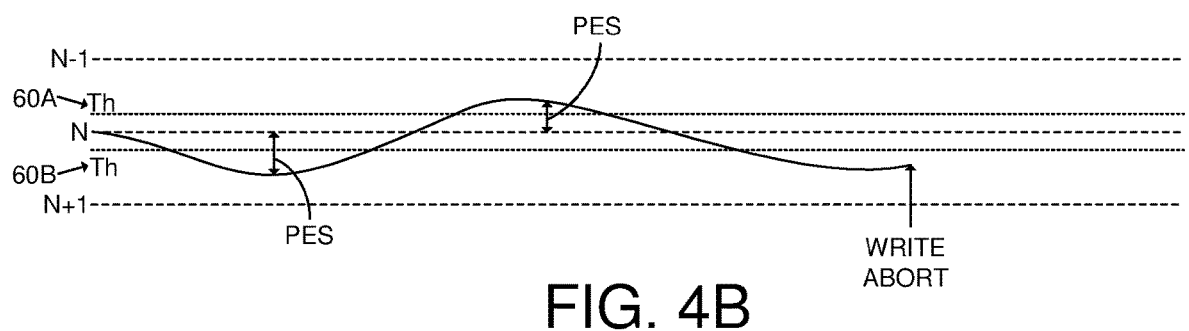
FIG. 4B shows an embodiment wherein when writing to data track N a track squeeze metric is accumulated for data track N−1 and for data track N+1.

In an embodiment shown in FIG. 4B, when writing to data track N a track squeeze metric may be generated and accumulated for each of data track N−1 and data track N+1. In this embodiment, a track squeeze metric for data track N−1 is generated by comparing the PES to threshold 60A, and a track squeeze metric for data track N+1 is generated by comparing the PES to threshold 60B. The write operation may be aborted if either of the accumulated track squeeze metrics for data track N−1 or data track N+1 exceeds a write abort threshold. This embodiment may be employed in a data storage device implementing conventional magnetic recording (CMR) wherein the data tracks may be written in a random order as compared to writing the data tracks sequentially such that only the previously written data track may be squeezed when writing to a current data track (e.g., with shingled magnet recording (SMR) wherein the data tracks are written sequentially in an overlapping manner). In an embodiment employing CMR, an accumulated track squeeze metric may be maintained for each data track and updated each time a data track is written (i.e., the accumulated track squeeze metric for each of the adjacent data tracks may be updated).

Figure 5:
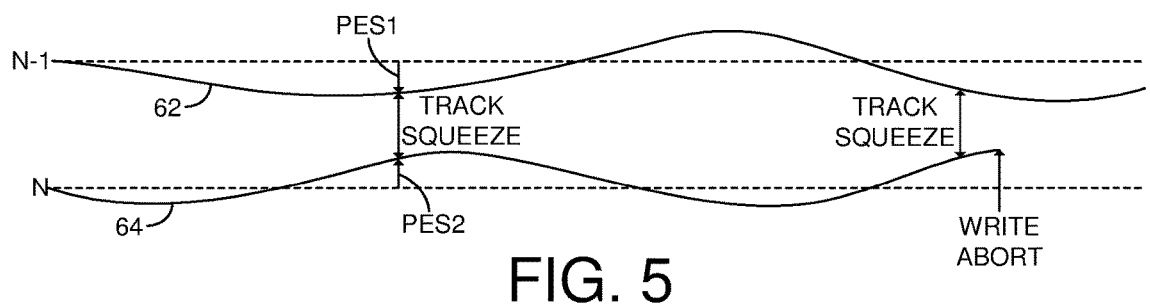
FIG. 5 shows an embodiment wherein a track squeeze metric is generated as a difference between the PES when writing to data track N−1 and data track N.

In one embodiment, the threshold 60A for data track N−1 may be configured dynamically based on the PES when writing to data track N−1. For example, the threshold 60A may be decreased when the write track trajectory for data track N−1 deviates toward data track N which can increase the track squeeze of data track N−1 when writing data track N. An example of this embodiment is disclosed in U.S. Pat. No. 9,026,728 entitled "DISK DRIVE APPLYING FEED-FORWARD COMPENSATION WHEN WRITING CONSECUTIVE DATA TRACKS," the disclosure of which is incorporated herein by reference. In another similar embodiment shown in FIG. 5, when writing data track N the track squeeze metric for data track N−1 may be generated based on a first PES while writing to data track N−1 (write track trajectory 62) and a second PES while writing to data track N (write track trajectory 64). For example, the track squeeze metric may be generated based on an inverse relationship between the first and second PES (i.e., increased as the spacing between the write track trajectories decreases). In one embodiment, the track squeeze metric may be zero when the spacing between the write track trajectories exceeds a threshold.

Figure 6:
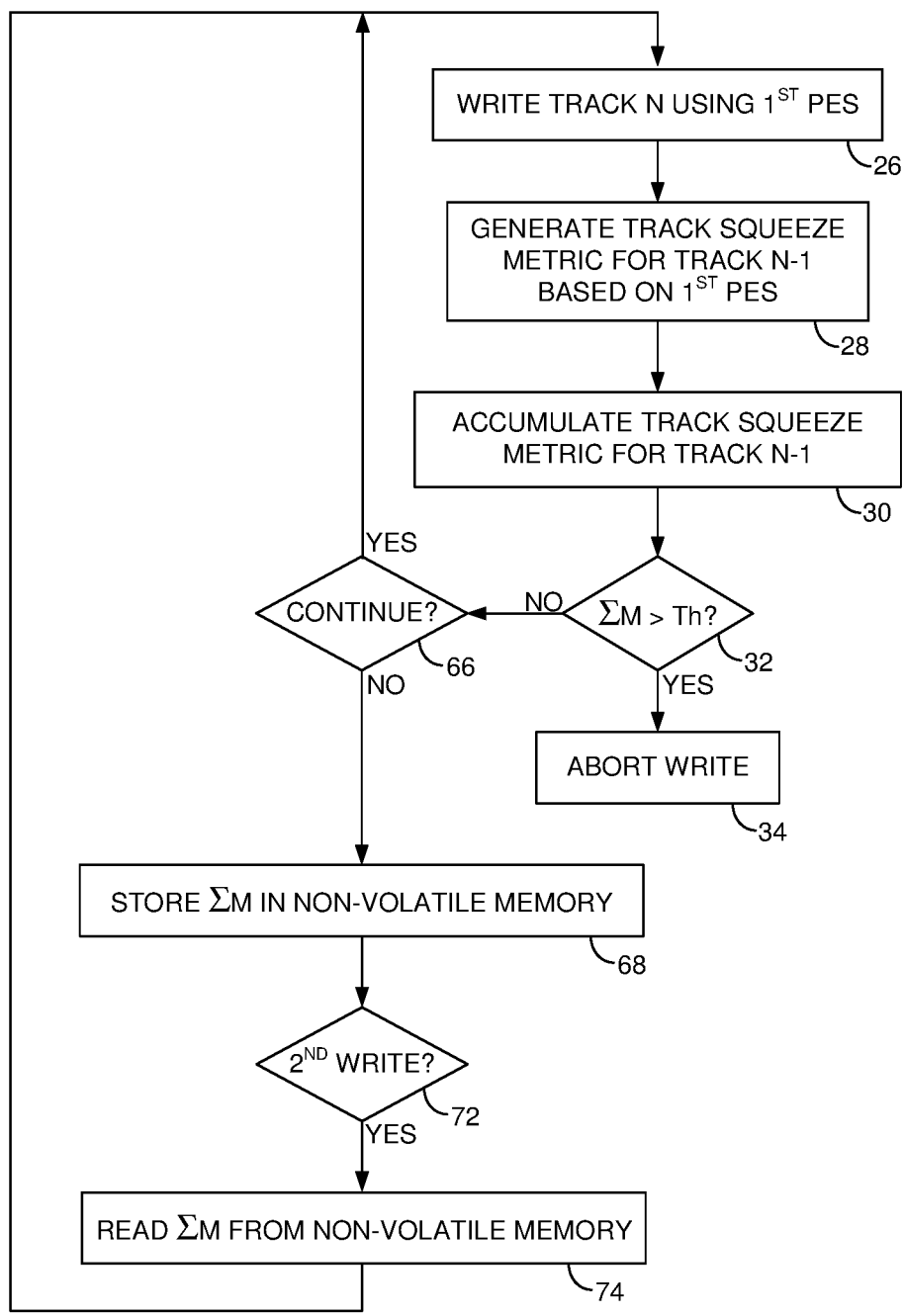
FIG. 6 is a flow diagram according to an embodiment wherein when writing to data track N terminates, the accumulated track squeeze metric for data track N−1 is stored and then updated during a subsequent write to data track N.

FIG. 6 is a flow diagram according to an embodiment which extends on the flow diagram of FIG. 2B, wherein in this embodiment the write to data track N may terminate (block 66) due, for example, to completing a random write to data track N in a CMR data storage device, or due to a power failure that terminates the write early. When the write is terminated (block 66), the accumulated track squeeze metric for data track N−1 (and optionally data track N+1) is stored in a non-volatile memory (block 68). For example, the accumulated track squeeze metric may be stored on the disk 18, or in a non-volatile semiconductor memory (NVSM) 70 such as shown in FIG. 2A. When a second write operation is to be executed to data track N (block 72), such as a second random CMR write or to complete a write operation after a power failure, the accumulated track squeeze metric for data track N−1 is read from the nonvolatile memory (block 74) and updated at block 30 during the second write operation. In one embodiment, the accumulated track squeeze metric for data track N−1 may also be updated when there is a write to data track N−2. That is, in a CMR data storage device the accumulated track squeeze metric for data track N−1 may be updated when there is a write to either adjacent data track N or N−2. In one embodiment, the track squeeze metric for data track N−1 may be reduced (e.g., zeroed) after writing to data track N−1 since there is no track squeeze with newly written data. In other embodiments described in more detail below, the accumulated track squeeze metric for data track N−1 may be adjusted after performing a read verify of data track N−1.

Figure 7A:
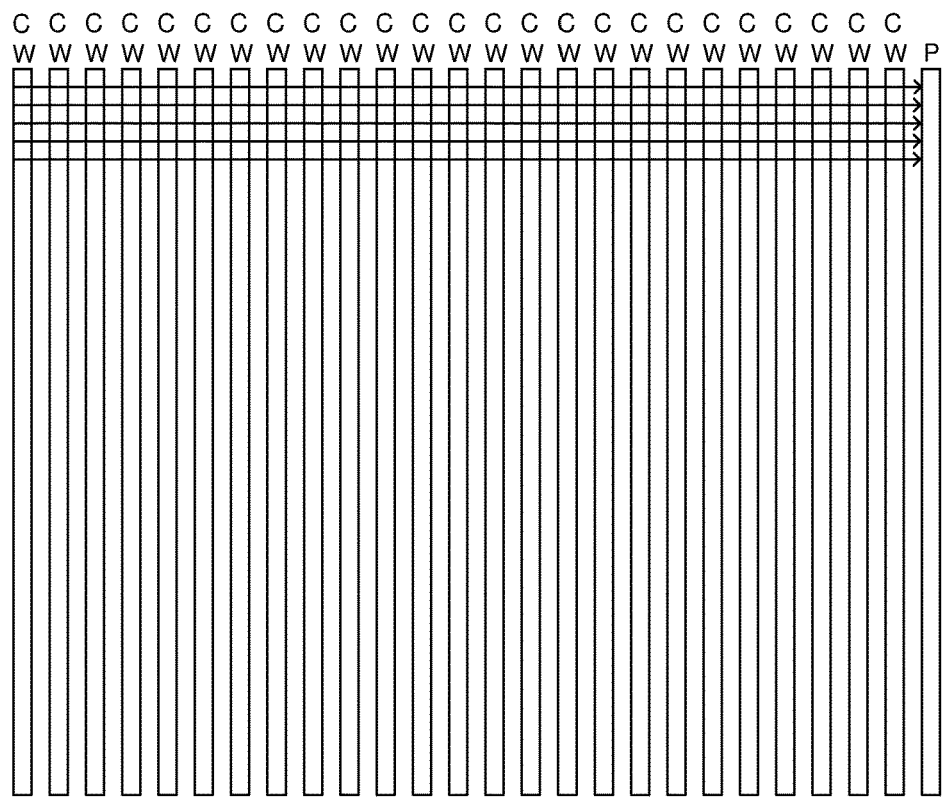
FIG. 7A shows an embodiment wherein track level redundancy in the form of a parity sector is generated over at least two data sectors in data track N−1.

FIG. 7A shows an embodiment wherein track level redundancy (P) is generated over at least two data sectors (CW) of a data track. In one embodiment, sector level redundancy is generated over the data stored in each data sector to form a data sector codeword, wherein the track level redundancy forms a track level codeword. For example, each data sector codeword may be generated based on a low density parity check (LDPC) code, and each track level codeword may be generated based on a parity sector generated by XORing the bits of the corresponding codewords. During a read operation, the track level parity sector may be processed to recover a data sector codeword that is unrecoverable using the sector level redundancy alone. The parity sector may be processed as a hard parity sector, meaning an unrecoverable data sector may be regenerated by XORing the recovered data sector codewords with the parity sector. In another embodiment described below, the parity sector may be processed as a soft parity sector, for example, by modifying the reliability metrics (e.g., log-likelihood ratios LLRs) of the symbols in the data sector codewords. In one embodiment, the track level redundancy (e.g., parity sector P) may be generated over an entire data track or over part of a data track. For example in one embodiment, multiple track level codewords may be generated for a data track, each covering a different subset of the data sectors. In one embodiment, a track level codeword may be generated over interleaves of a data track, for example, by generating a first track level codeword over an even interleave of the data sectors, and generating a second track level codeword over an odd interleave of the data sectors. In one embodiment, a track squeeze metric is generated and accumulated corresponding to each track level codeword (e.g., a track level codeword generated over a part of a data track or an interleave of a data track). A write to an adjacent data track may then be aborted when any of the accumulated track squeeze metrics for each of multiple track level codewords exceeds a write abort threshold.

Figure 7B:
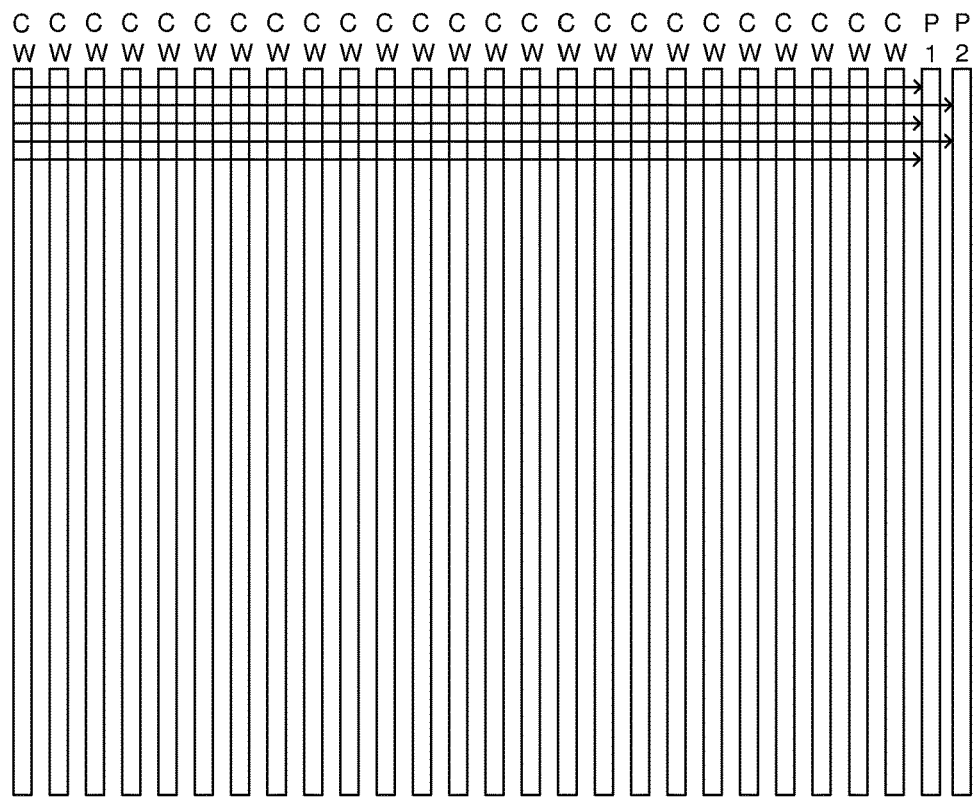
FIG. 7B shows an embodiment wherein multiple parity sectors may be generated over at least two data sectors in data track N−1.

In one embodiment shown in FIG. 7B, a block of data sector codewords may be covered by multiple parity sectors, for example, by generating a first parity sector P1 over each symbol in a first interleave (e.g., even interleave) of each codeword, and generating a second parity sector P2 over each symbol in a second interleave (e.g., odd interleave) of each codeword. In one embodiment, multiple parity sectors may be generated over different symbol resolutions (e.g., every ½ and every ¼ symbols), and the reliability metrics updated in a cascading manner starting with the lowest resolution parity sector. Examples of this codeword arrangement are disclosed in U.S. Pat. No. 10,373,645 entitled "DATA STORAGE DEVICE DYNAMICALLY GENERATING EXTENDED REDUNDANCY OVER INTERLEAVES OF A DATA TRACK," the disclosure of which is incorporated herein by reference.

In one embodiment, the track squeeze metric (e.g., generated at each servo sector) for data track N−1 may be generated based on the PES when writing to data track N as well as one or more other factors. For example, in one embodiment each track squeeze metric may be generated by weighting an off-track measurement (based on the PES) with a weighting factor. In this manner, the accumulated track squeeze metric may be generated as:

$$\Sigma M = w1 \cdot PES1 + w2 \cdot PES2 + w3 \cdot PES3$$

Any suitable value may be assigned to each of the weights (w1, w2, w3, . . . ) in the above equation. In the example embodiment described above with reference to FIG. 4A, the weight may be assigned a value of one when the PES is above the threshold Th 60A and a value of zero when below the threshold Th 60A. In another embodiment, a weight may be configured to zero when the corresponding data sector in data track N−1 has been relocated due, for example, to a defect on the disk. In this embodiment, the weight may be zero since an off-track write does not corrupt data in data track N−1. In another embodiment, the values assigned to each weight may vary based on the correction power of a track level redundancy generated for data track N−1.

Figure 8A:
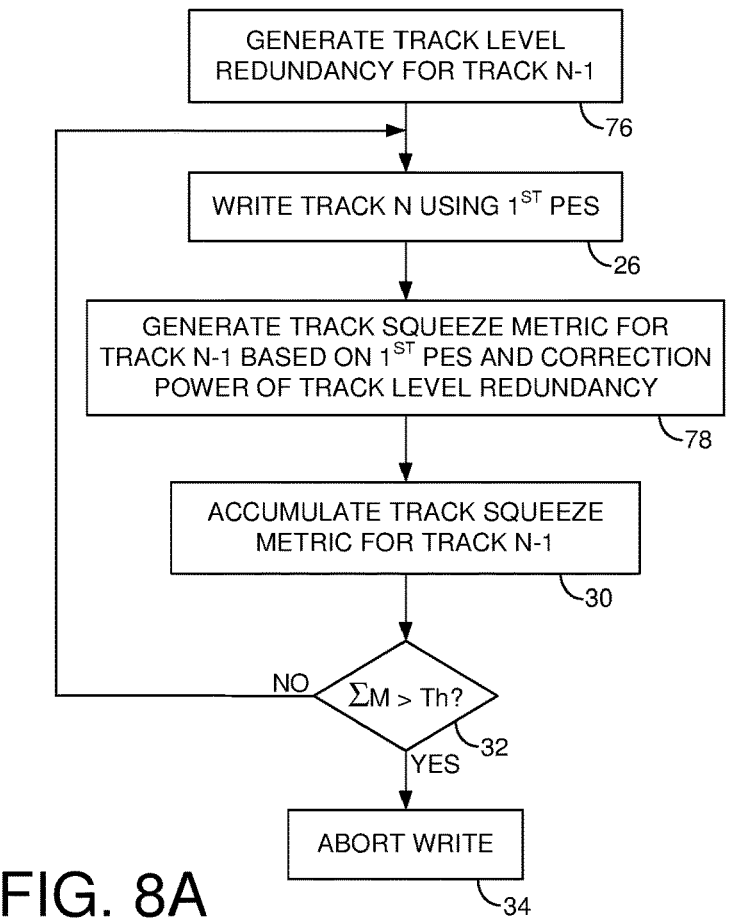
FIG. 8A is a flow diagram according to an embodiment wherein the track squeeze metric for data track N−1 may be generated based on PES of the write to data track N and the correction power of track level redundancy for data track N−1.
Figure 8B:
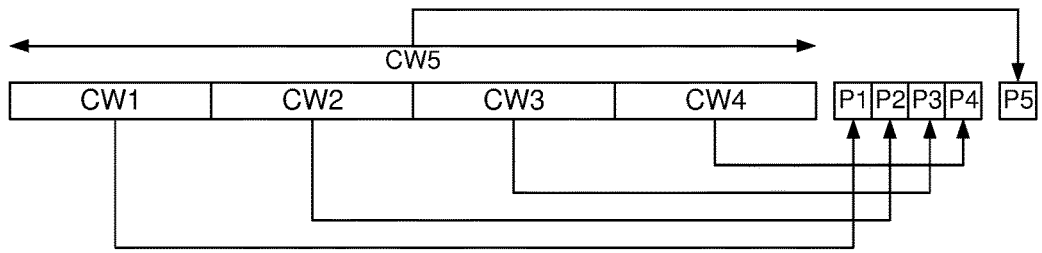
FIG. 8B shows an embodiment wherein multiple track level codewords may be generated for a data track, as well as a global track codeword, wherein the correction power of the global track codeword may vary (e.g., decrease) during a write operation to an adjacent data track.

An example of this embodiment is shown in the flow diagram of FIG. 8A which extends on the flow diagram of FIG. 2B, wherein track level redundancy is generated for data track N−1 (block 76), and the track squeeze metric is generated based on the PES when writing to data track N and the correction power of the track level redundancy (block 78). For example, in an embodiment shown in FIG. 8B multiple track level codewords (CW1, CW2, CW3 . . . ) may be generated for data track N−1 by generating a corresponding parity sector (P1, P2, P3 . . . ). A global track level codeword (CW5) may also be generated over at least two of the local track level codewords (four local codewords in this embodiment). An accumulated track squeeze metric may be generated for each of the local track level codewords as well as for the global track level codeword. During a write to data track N, if the accumulated track squeeze metric for a local track level codeword in data track N−1 exceeds a threshold, the weightings in the above equation for generating the accumulated track squeeze metric for the global track level codeword (CW5) may be increased since the correction power of the track level redundancy will have decreased.

In other embodiments, the track squeeze metric may be generated using a more complex function of the PES. For example, in one embodiment the track squeeze metric may be generated based on a suitable polynomial or exponential function of the PES since the track squeeze effect of an off-track write may be more accurately modeled using a more complex function as compared to a simple linear function of the PES. In another embodiment, the track squeeze metric may be generated by weighting the output of a more complex function of the PES.

Figure 8C:
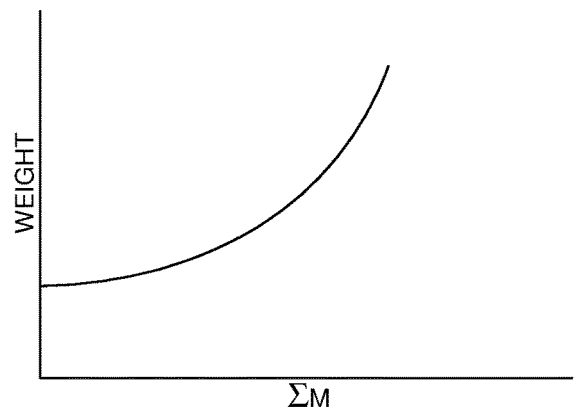
FIG. 8C shows an embodiment wherein a weight for weighting the track squeeze metric may increase based on any suitable function (e.g., polynomial, exponential, etc.) of the accumulated track squeeze metric.

FIG. 8C shows an embodiment wherein the weight in the above equation for weighting the track squeeze metric may increase based on any suitable function (e.g., polynomial, exponential, etc.) of the accumulated track squeeze metric. That is as the accumulated track squeeze metric nears the write abort threshold, in one embodiment the weighting of the subsequent track squeeze metrics may increase to better model the non-linear reduction in the efficacy of the track level redundancy.

Figure 9:
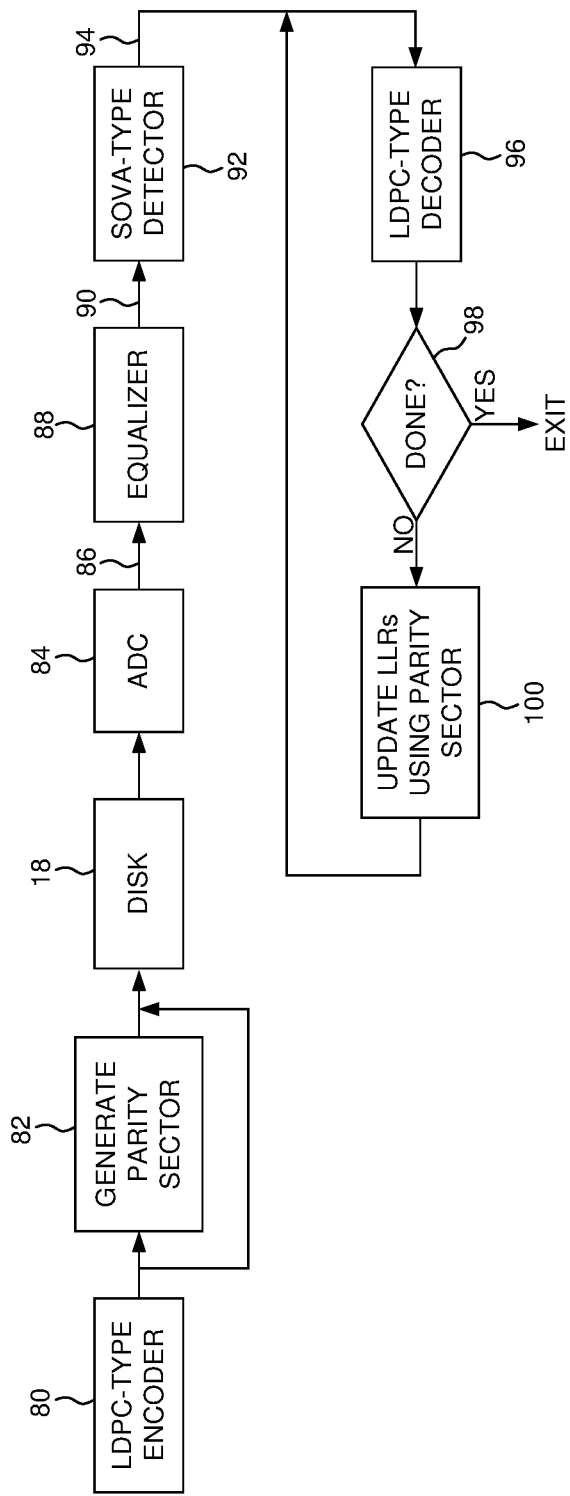
FIG. 9 shows control circuitry according to an embodiment for executing data recovery during a read operation.

FIG. 9 shows control circuitry according to an embodiment wherein an LDPC-type encoder 80 encodes data into a plurality of codewords. A parity sector is generated (block 82), for example, by XORing the corresponding bits of each codeword. The codewords and the parity sector are written to the disk 18 (in alternative embodiment the parity sector may be written to the NVSM 70). During a read operation, the codewords and the parity sector are read from the disk/NVSM to generate a read signal, and an analog-to-digital converter (ADC) 84 samples the read signal to generate read signal samples 86. The read signal samples 86 are equalized according to a target partial response (block 88) to generate equalized samples 90. A SOVA-type detector 92 processes the equalized samples 90 to generate a reliability metric 94 (in this embodiment an LLR) for each symbol of a corresponding codeword. The LLRs 94 of each codeword are iteratively processed using an LDPC-type decoder 96, and if the LDPC-type decoding fails due to at least one of the codewords failing to converge (block 98), the LLRs for at least one of the un-converged codewords are updated based on the parity sector (block 100), and the updated LLRs are processed again by the LDPC-type decoder 96. The process of updating the LLRs of an un-converged codeword using the parity sector at block 100 and reprocessing the updated LLRs by the LDPC-type decoder 96 may be repeated a number of times until all of the codewords converge.

Any suitable technique may be employed to update the LLRs of a codeword using the parity bits of the parity sector. In general, when processing the LLRs of the codewords corresponding to one of the parity sector parity bits, at least one of the LLRs across the un-converged codewords is modified so that the likelihood of a codeword bit flips its binary state, thereby satisfying the parity of the parity sector. When at least one of the LLRs is updated correctly, it improves the likelihood the corresponding codeword will converge during the subsequent processing by the LDPC-type decoder 96. As each un-converged codeword such as shown in FIG. 7A converges, there is a corresponding improvement in the update accuracy of the parity sector, further improving the likelihood of recovering all of the un-converged codewords. A suitable technique for updating the LLRs of un-converged codewords using a parity sector is disclosed in U.S. Pat. No. 9,632,863 entitled "TRACK ERROR-CORRECTION CODE EXTENSION," the disclosure of which is incorporated herein by reference.

Figure 10A:
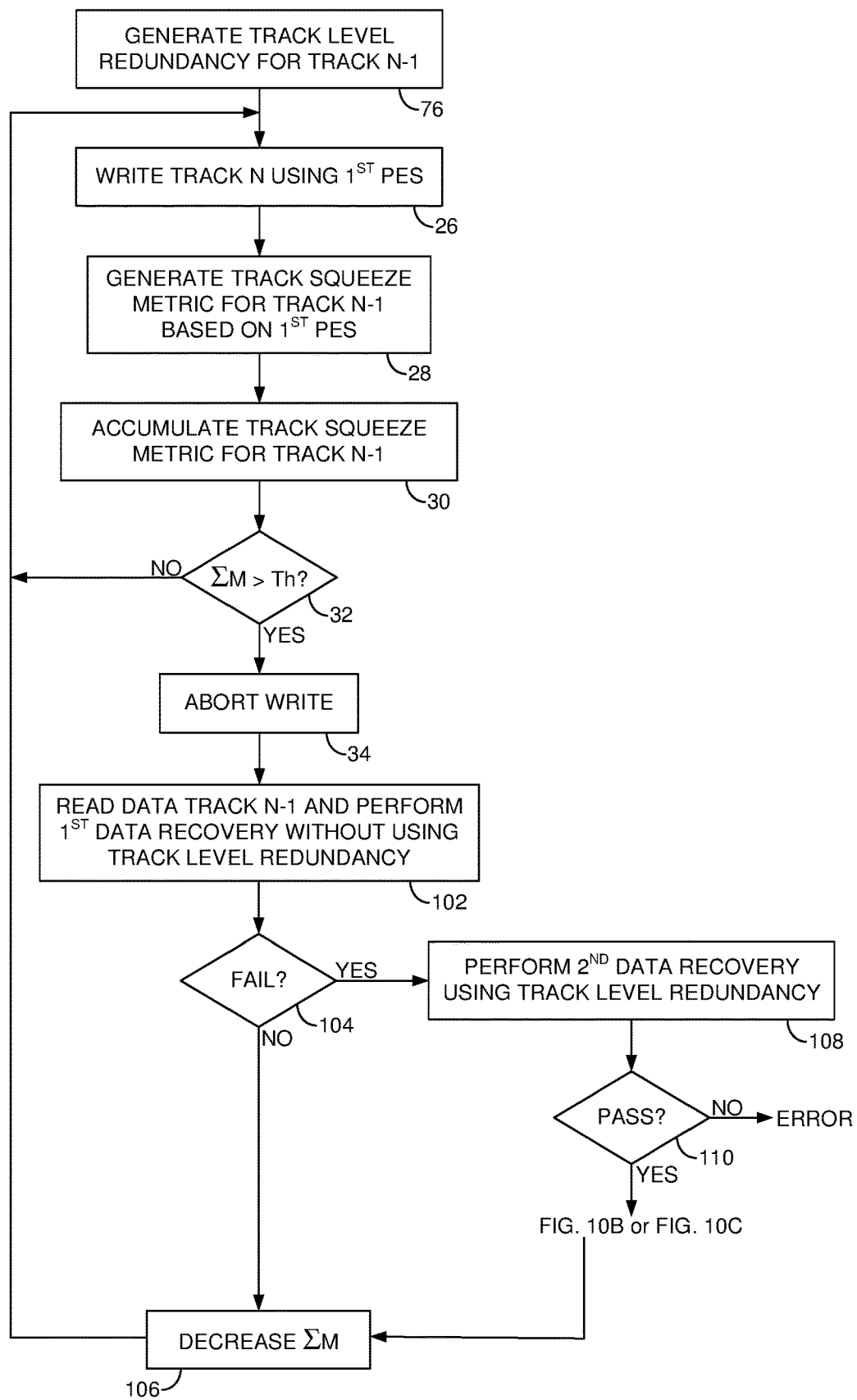
FIG. 10A is a flow diagram according to an embodiment wherein after aborting a write to data track N, a first data recover is performed on the data sectors of data track N−1 without using the track level redundancy, and when the first data recover fails, a second data recover is performed on the data sectors using the track level redundancy.

FIG. 10A is a flow diagram according to an embodiment which extends on the flow diagram of FIG. 8, wherein when the accumulated track squeeze metric for data track N-1 exceeds the write abort threshold (block 32) while writing to data track N, after aborting the first write (block 34) the data sectors in data track N-1 corresponding to the track level codeword are read and a first data recover of the data sectors is performed without using the track level redundancy (block 102). When the first data recovery succeeds (block 104), the accumulated value of the track squeeze metric for data track N-1 is decreased (block 106) and the first write to data track N continues at block 26. For example referring to the embodiment of FIG. 9, when the data sectors are successfully recovered using the LDPC-type decoder 96 without needing to process the track level parity sector at block 100, it means the integrity of the data recorded in the data sectors is still sufficiently high to effectively ignore the degradation of the previously detected track squeeze. Accordingly the value of the accumulated track squeeze metric for the corresponding track level codeword of data track N-1 can be decreased (or even reset to zero) and the write to data track N continued. When the first data recovery fails at block 104, a second data recover of the data sectors is performed using the track level redundancy (block 108). Referring again to the embodiment of FIG. 9, when the LDPC-type decoder 96 fails to recover the data sectors, the reliability metrics of the data sectors may be updated using the parity sector (block 100) and the LDPC-type decoding reiterated until the data sectors are recovered. After successfully recovering the data sectors (block 110), in one embodiment at least one of the recovered data sectors may be relocated (e.g., to a different data track or to the NVSM 70), or alternatively at least one of the recovered data sectors may be rewritten (block 112 of FIG. 10B). Once a degraded data sector has been relocated or rewritten, the accumulated track squeeze metric for the corresponding track level codeword in data track N-1 is decreased at block 106 and the write to data track N continues.

FIG. 10C is a flow diagram according to an embodiment wherein when after executing the second data recovery procedure on the data sectors of data track N-1 at block 108 of FIG. 10A, the write to data track N is completed (block 114). After completing the write to data track N, a read verify operation is performed on the data sectors of data track N-1 (block 116). In one embodiment, the read verify operation at block 116 may execute any suitable data recovery procedures, including to use the track level redundancy of the track level codeword. If the data sectors are successfully recovered during the read verify operation (block 118), the accumulated track squeeze metric for the track level codeword of data track N-1 is configured based on the integrity of the data sectors (block 122). For example, if the data sectors of data track N-1 were recovered at block 116 without needing the track level redundancy, it means the integrity of the data sectors is relatively high and so the accumulated track squeeze metric may be configured to a low value at block 122. If the data sectors of data track N-1 cannot be recovered at block 116, at least one of the data sectors is relocated or rewritten (block 120) using the data recovered by the second data recover procedure (block 108 of FIG. 10A). The accumulated track squeeze metric for the track level codeword of data track N-1 is configured at block 122 based on the number of data sectors that are relocated or rewritten as well as the integrity of the other data sectors that remain unmodified in the track level codeword of data track N-1. The updated accumulated track squeeze metric is then stored at block 124 in a non-volatile memory (e.g., the disk 18 or NVSM 70) and used during subsequent writes to data track N as described above with reference to FIG. 6. In one embodiment, the accumulated track squeeze metric for a track level codeword of a data track may be stored and updated during writes to one of the adjacent data tracks when the data tracks are written randomly (e.g., CMR) as opposed to written sequentially (e.g., SMR).

In an embodiment where the accumulated track squeeze metrics for the track level codewords of each data track are stored and updated during write operations to adjacent data tracks, the accumulated track squeeze metric for a track level codeword may be updated when the data sectors of the track level codeword are read during normal read operations. For example, during a normal read operation the integrity of the data sectors in a track level codeword may be measured based on any suitable quality metric, such as the quality of the read signal, number of bit errors detected, number of LDPC iterations required to recover a data sector, whether the track level redundancy was needed to recover one or more data sectors, etc. The accumulated track squeeze metric may then be configured for the track level codeword based on the measured integrity of the data sectors similar to block 122 of FIG. 10C.

In an embodiment wherein the data tracks are written sequentially from an outer diameter toward an inner diameter or from an inner diameter toward an outer diameter of the disk (e.g., SMR), the data written to the previously written data track may be cached (e.g., in a volatile semiconductor memory). In this manner, if a read verify fails for data track N–1 (e.g., after aborting a write to data track N or after completing a write to data track N), the cached data may be used to relocate or rewrite at least one data sector in data track N–1. In one embodiment, when the accumulated track squeeze metric for a track level codeword in data track N–1 exceeds a threshold during a write to data track N, this may trigger a read verify of data track N–1 after completing the write to data track N.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above. The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
 a disk comprising a plurality of data tracks, including consecutive data tracks N–1 and N;
 a head actuated over the disk; and
 control circuitry configured to:
  first write to data track N using a first position error signal (PES) representing a position of the head relative to the data tracks;
  generate a track squeeze metric for data track N–1 based on at least the first PES of the first write;
  accumulate the track squeeze metric for data track N–1 during the first write; and
  abort the first write when the accumulated track squeeze metric for data track N–1 exceeds a first threshold.

2. The data storage device as recited in claim 1, wherein the track squeeze metric is based on the first PES exceeding a second threshold toward data track N–1.

3. The data storage device as recited in claim 1, wherein the track squeeze metric comprises a degree of track squeeze for data track N–1 based on the first PES during the first write and a second PES during a second write to data track N–1.

4. The data storage device as recited in claim 1, wherein the data tracks include consecutive data tracks N–1, N, and N+1, and the control circuitry is further configured to:
 generate a track squeeze metric for data track N+1 based on the first PES of the first write;
 accumulate the track squeeze metric for data track N+1 during the first write; and
 abort the first write when the accumulated track squeeze metric for data track N+1 exceeds the first threshold.

5. The data storage device as recited in claim 1, wherein after the first write the control circuitry is further configured to:
 store the accumulated track squeeze metric for data track N–1 in a non-volatile memory;
 read the accumulated track squeeze metric for data track N–1 from the non-volatile memory; and
 update the accumulated track squeeze metric for data track N–1 during a second write to data track N.

6. The data storage device as recited in claim 1, wherein data track N–1 comprises a plurality of data sectors and the control circuitry is further configured to:
 generate a track level redundancy over at least two of the data sectors in data track N–1; and generate the track squeeze metric for data track N−1 during the first write based on the first PES of the first write and a correction power of the track level redundancy.

7. The data storage device as recited in claim 1, wherein data track N−1 comprises a plurality of data sectors and the control circuitry is further configured to:
generate a track level redundancy over at least two of the data sectors in data track N−1;
after aborting the first write, read the at least two data sectors in data track N−1 and perform a first data recover of the data sectors without using the track level redundancy; and
when the first data recovery succeeds, decrease the accumulated value of the track squeeze metric for data track N−1 and continue the first write to data track N.

8. The data storage device as recited in claim 7, wherein when the first data recovery fails, the control circuitry is further configured to:
perform a second data recovery of the at least two data sectors in data track N−1 using the track level redundancy; and
when the second data recovery succeeds:
relocate at least one of the data sectors in data track N−1; and
continue the first write to data track N.

9. The data storage device as recited in claim 7, wherein when the first data recovery fails, the control circuitry is further configured to:
perform a second data recovery of the at least two data sectors in data track N−1 using the track level redundancy; and
when the second data recovery succeeds:
rewrite at least one of the data sectors in data track N−1; and
continue the first write to data track N.

10. The data storage device as recited in claim 7, wherein when the first data recovery fails, the control circuitry is further configured to:
perform a second data recovery of the at least two data sectors in data track N−1 using the track level redundancy; and
when the second data recovery succeeds:
continue the first write to data track N; and
after the first write to data track N, verify the data sectors in data track N−1 are recoverable.

11. The data storage device as recited in claim 10, wherein when the verify fails, the control circuitry is further configured to relocate at least one of the data sectors in data track N−1.

12. A data storage device comprising:
a disk comprising a plurality of data tracks, including consecutive data tracks N−1 and N;
a head actuated over the disk; and
control circuitry configured to:
first write to data track N−1 using a first position error signal (PES) representing a position of the head relative to the disk;
second write to data track N using a second PES;
generate a track squeeze metric for data track N−1 based on at least the first PES of the first write and the second PES of the second write;
accumulate the track squeeze metric for data track N−1 during the second write;
abort the second write when the accumulated track squeeze metric for data track N−1 exceeds a first threshold.

13. The data storage device as recited in claim 12, wherein the data tracks include consecutive data tracks N−1, N, and N+1, and the control circuitry is further configured to:
prior to the second write, third write to data track N+1 using a third PES;
generate a track squeeze metric for data track N+1 based on the second PES of the second write and the third PES of the third write;
accumulate the track squeeze metric for data track N+1 during the second write; and
abort the second write when the accumulated track squeeze metric for data track N+1 exceeds the first threshold.

14. The data storage device as recited in claim 12, wherein after the first write the control circuitry is further configured to:
store the accumulated track squeeze metric for data track N−1 in a non-volatile memory;
read the accumulated track squeeze metric for data track N−1 from the non-volatile memory; and
update the accumulated track squeeze metric for data track N−1 during a second write to data track N.

15. The data storage device as recited in claim 12, wherein data track N−1 comprises a plurality of data sectors and the control circuitry is further configured to:
generate a track level redundancy over at least two of the data sectors in data track N−1; and
generate the track squeeze metric for data track N−1 during the first write based on the first PES of the first write, the second PES of the second write, and a correction power of the track level redundancy.

16. The data storage device as recited in claim 12, wherein data track N−1 comprises a plurality of data sectors and the control circuitry is further configured to:
generate a track level redundancy over at least two of the data sectors in data track N−1;
after aborting the second write, read the at least two data sectors in data track N−1 and perform a first data recover of the data sectors without using the track level redundancy; and
when the first data recovery succeeds, decrease the accumulated value of the track squeeze metric for data track N−1 and continue the second write to data track N.

17. The data storage device as recited in claim 16, wherein when the first data recovery fails, the control circuitry is further configured to:
perform a second data recovery of the at least two data sectors in data track N−1 using the track level redundancy; and
when the second data recovery succeeds:
relocate at least one of the data sectors in data track N−1; and
continue the second write to data track N.

18. The data storage device as recited in claim 16, wherein when the first data recovery fails, the control circuitry is further configured to:
perform a second data recovery of the at least two data sectors in data track N−1 using the track level redundancy; and
when the second data recovery succeeds:
rewrite at least one of the data sectors in data track N−1; and
continue the first write to data track N.

19. The data storage device as recited in claim 16, wherein when the first data recovery fails, the control circuitry is further configured to:

perform a second data recovery of the at least two data sectors in data track N−1 using the track level redundancy; and when the second data recovery succeeds:
continue the first write to data track N; and
after the first write to data track N, verify the data sectors in data track N−1 are recoverable.

20. A data storage device comprising:
a disk comprising a plurality of data tracks, including consecutive data tracks N−1 and N;
a head actuated over the disk;
a means for first writing to data track N using a first position error signal (PES) representing a position of the head relative to the data tracks;
a means for generating a track squeeze metric for data track N−1 based on at least the first PES of the first writing;
a means for accumulating the track squeeze metric for data track N−1 during the first writing;
a means for storing in a non-volatile memory the accumulated track squeeze metric for data track N−1 generated during the first writing; and
a means for reading the accumulated track squeeze metric from the non-volatile memory and updating the accumulated track squeeze metric during a second writing to data track N.

* * * * *